Feb. 11, 1930.  W. G. CHAUSSE  1,746,928
SHOCK ABSORBER
Filed Sept. 30, 1927
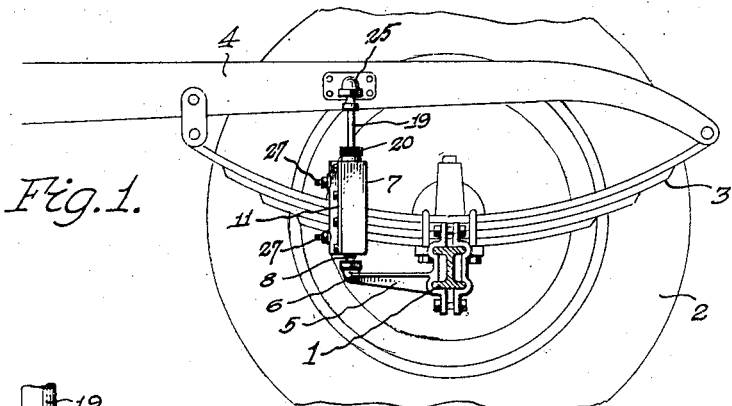
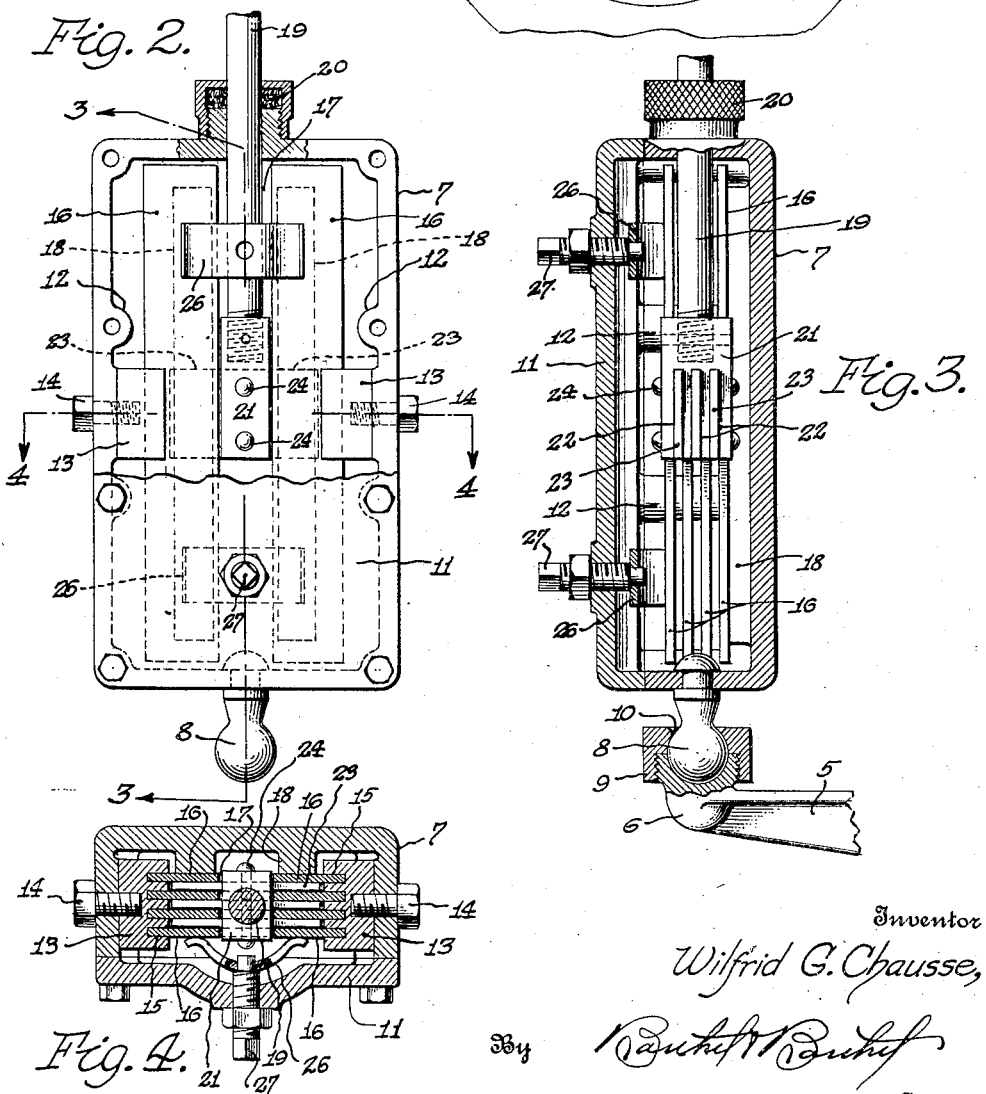
Inventor
Wilfrid G. Chausse, Patented Feb. 11, 1930

1,746,928

UNITED STATES PATENT OFFICE

WILFRID G. CHAUSSE, OF DETROIT, MICHIGAN

SHOCK ABSORBER

Application filed September 30, 1927. Serial No. 223,010.

The present invention pertains to a novel shock absorber constructed particularly for application to vehicles.

The principal object of the invention is to provide a simple device of this general character utilizing the frictional resistance between two members, or groups of members, which move in a straight line path relatively to each other, as distinguished from present devices wherein the friction surfaces are curved and consist generally of a strap turning on a drum. Briefly, the present invention consists of two sets of friction plates, one set being fixed and the other set being movable through a connection to the spring supported frame or chassis of the vehicle. Pressure devices are applied to the ends of the fixed plates so that the movable element meets with resistance in both directions. The pressure means is adjustable on the fixed plates to vary the amount of pressure applied thereto, so that the resistance presented to the movable element may be regulated according to desire, load or road conditions.

The invention is fully disclosed by way of example in the following description and in the accompanying drawings, in which—

Figure 1 is a detail elevation of a motor vehicle showing the device of the invention applied thereto;

Fig. 2 is an elevation of the device partly broken away to show the interior;

Fig. 3 is a longitudinal section on the line 3—3 of Figure 2; and

Fig. 4 is a transverse section on the line 4—4 of Figure 2.

Reference to these views will now be made by use of like characters which are employed to designate corresponding parts throughout.

In Figure 1 are shown several parts of a conventional motor vehicle, namely an axle 1 carrying a wall 2 and supporting a spring 3 on which rests the frame or chassis 4. From the axle is extended an arm 5 for each wheel, and this arm is formed with a socket end 6. From the arm is supported a casing 7 by means of a knob 8 fixed in the bottom thereof and received in the member 6. A retainer 9 having a cavity 10 conforming to the surface of the member 8 is screwed upon the socket member 6 in order to permit universal movement of the knob 8 and prevent the same from being withdrawn from its socket. The housing 8 further comprises a removable wall or cover plate 11 which is bolted to internal ears 12 after the interior assembly has been completed.

A block 13 is secured to each of the longitudinal lateral walls of the casing by means of bolts 14 as shown more clearly in Figures 2 and 4. The innermost face of each block is formed with a series of parallel slots 15 into which are sweated or otherwise secured the edges of friction plates 16. In this way two distinct sets of superposed or parallel plates are provided in the casing and the plates are of such width as to retain a space 17 between their inner edges longitudinally of the housing as shown in Figure 2 which also indicates that the plates have substantially the same length as the casing. Internal ribs 18 formed longitudinally on the base of the casing engage the plates 16 nearest thereto to provide a backing for the plates against a pressure means which will presently be described.

A rod 19 slidable through a gland 20 at the top of the casing has its inner end disposed in the space 17. On this inner end is secured a head 21 also slidable in the space 17 and formed with slots 22 parallel to and alternating with the slots 15. Into the slots 22 are fitted transverse plates 23 which extend into the spaces between the plates 16 and are engaged thereby on both surfaces. The plates 23 may be secured to the head 21 by rivets 24 as shown in Figures 2, 3 and 4. The upper end of the rod 19 has a socket connection 25 to the frame 4, similar to the universal joint at the lower end of the casing.

The two series of fixed plates 16 are bridged by arched springs 26 near the ends thereof and on the side opposed to the ribs 18. By means of screws 27 passed through the cover plate 11 and bearing on the springs, the spaces between the plates 16 may be varied as desired, thereby altering the resistance to the sliding movement of the transverse plates 23 at these ends.

The provision of the spacer blocks 13 intermediate the ends of the plates 16 and the absence of a pressure device in this region permit a comparatively easy sliding movement of the slidable plates 23 between the ends of the longitudinal plates 16. This region of comparatively unresisted sliding movement of the plates 23 permits the normal oscillations of the frame 4 and axle 1 without obstruction. When the amplitude of such oscillations increases, the sliding plates are carried into the pressure areas at the ends of the longitudinal plates 16, whereby their sliding movement is retarded and the shock is cushioned or absorbed. Due to the fact that such a pressure or resistance area is provided at both ends of the housing, the shock is cushioned in either direction, as distinguished from present devices which cushion the shock in one direction only and have a take up mechanism acting in the other direction. It will also be apparent that the resistance to the sliding movement of the plates 23 at the ends of the plates 16 may be varied according to requirements or conditions by means of screws 27. To insure smooth operation of the device, the casing 7 is packed with grease.

Although a specific embodiment of the invention has been illustrated and described, it will be understood that various alterations in the details of construction may be made without departing from the scope of the invention as indicated by the appended claims.

What I claim is:—

1. In a shock absorber, a series of spaced fixed plates, a series of comparatively shorter friction members alternating with said fixed plates and in contact therewith, said friction members being bound together and adapted to slide bodily along said fixed plates and between the ends thereof, and means for exerting pressure on said fixed plates at the ends thereof.

2. In a shock absorber, a series of spaced fixed plates, a series of friction members alternating with said fixed plates and in contact therewith, said friction members being bound together and adapted to slide bodily along said fixed plates, and means for exerting pressure on said fixed plates at the ends of the path of the slidable members, whereby to maintain between said ends a neutral zone permitting relatively easy sliding of the friction members.

3. In a shock absorber, a series of spaced fixed plates, a series of friction members alternating with said fixed plates and in contact therewith, said friction members being bound together and adapted to slide bodily along said fixed plates, and variable pressure devices applied to said fixed plates at the ends thereof.

4. A shock absorber comprising a casing, a series of spaced plates fixed therein and extending the entire length of said casing, a rod slidable through said casing longitudinally of the plates, a series of comparatively short friction members secured to said rod and alternating with said plates in frictional engagement therewith, said friction members being adapted to slide between the ends of said plates, and variable pressure devices applied to said plates at the ends of the path of said friction members.

In testimony whereof I affix my signature.
WILFRID G. CHAUSSE.